United States Patent [19]

Nakai et al.

[11] Patent Number: 5,726,276
[45] Date of Patent: Mar. 10, 1998

[54] PROCESS FOR PREPARING POLYACETAL COPOLYMER

[75] Inventors: Akira Nakai; Eiji Masuda; Kaoru Yamamoto, all of Shizuoka, Japan

[73] Assignee: Polyplastics Co., Ltd., Japan

[21] Appl. No.: 725,650

[22] Filed: Oct. 1, 1996

[30] Foreign Application Priority Data

Oct. 2, 1995 [JP] Japan .................. 7-255078

[51] Int. Cl.$^6$ .................................. C08G 4/00
[52] U.S. Cl. ............... 528/234; 568/601; 568/603
[58] Field of Search ................ 528/234; 568/601, 568/603

[56] References Cited

U.S. PATENT DOCUMENTS 4,931,535  6/1990  Yamamoto et al. ............... 528/230

FOREIGN PATENT DOCUMENTS 52-57285  5/1977  Japan .
57-80414  5/1982  Japan .
62-285909  12/1987  Japan .
63-27519  2/1988  Japan .

*Primary Examiner*—Melvyn I. Marquis
*Assistant Examiner*—D. Aylward
*Attorney, Agent, or Firm*—Nixon & Vanderhye P.C.

[57] ABSTRACT

The present invention provides a process for preparing a thermally very stable polyacetal copolymer having very small unstable terminals even at a high polymerization yield, by the copolymerization of trioxane as the principal monomer with a comonomer copolymerizable therewith, wherein an isopolyacid or an acidic salt thereof is used as a polymerization catalyst; the catalyst can simply be deactivated in a small amount of a deactivator solution after the polymerization; and a washing step is not required. The copolymerization is effected with an isopolyacid or an acidic salt thereof used as a polymerization catalyst until the remaining monomers account for at most 10% by weight of all the fed monomers, and a solution containing a deactivator for the above catalyst is added in an amount of 0.01 to 10% by weight based on the resulting crude polymer to deactivate the catalyst, followed by subjecting the crude polymer intact to a heat-melting treatment without washing it.

7 Claims, No Drawings

PROCESS FOR PREPARING POLYACETAL COPOLYMER

FIELD OF THE INVENTION

The present invention relates to a process for preparing a polyacetal copolymer, more specifically to a process for preparing a polyacetal copolymer which is excellent in quality such as heat stability by a simple step using an isopolyacid or an acidic salt thereof in the copolymerization of trioxane as the principal monomer with a comonomer copolymerizable therewith.

DESCRIPTION OF THE RELATED ART

Cation copolymerization of trioxane as the principal monomer with a cyclic ether or cyclic formal having two or more carbon atoms adjacent to each other as a comonomer has so far been known as a process for preparing a polyacetal copolymer. Cationic catalysts proposed for use in this copolymerization include Lewis acids, particularly halides of boron, tin, titanium, phosphorus, arsenic and antimony, for example, boron trifluoride, tin tetrachloride, titanium tetrachloride, phosphorus pentachloride, phosphorus pentafluoride, arsenic pentafluoride and antimony pentafluoride, and complex compounds or salts thereof, protonic acids, for example, perchloric acid, esters of protonic acids, particularly esters of perchloric acid with aliphatic lower alcohols, for example, tertiary butyl perchlorate, anhydrides of protonic acids, particularly mixed anhydrides of perchloric acid and aliphatic lower carboxylic acids, for example, acetyl perchlorate, or trimethyloxonium hexafluorophosphate, triphenyl-methyl hexafluoroarzenate, acetyl tetrafluoroborate, acetyl hexafluorophosphate, and acetyl hexafluoroarzenate.

Among them, boron trifluoride or a coordinate compound of boron trifluoride with an organic compound, for example, ethers, is the most typical as a copolymerization catalyst for trioxane as the principal monomer and industrially widely used.

Conventional polymerization catalysts such as a boron trifluoride compound are required in relatively large amounts (for example, 40 ppm or more based on the whole monomers), and therefore it is difficult to sufficiently effect a deactivation treatment after the polymerization. Even though the deactivation treatment is accomplished, the residual matters originating in the catalyst accelerate decomposition to restrict the polymerization yield and the polymerization degree. Further, there is the problem that the presence of considerable amounts of the unstable terminals requires a complicated stabilizing step.

That is, in the copolymerization of trioxane with conventional catalysts as described above, deactivation of the catalysts after the polymerization is important, and the insufficient deactivation thereof accelerates a decomposition of the resulting polymer and produces a primary cause to damage a subsequent stabilization of the resulting polymer. Accordingly, in the case where boron trifluoride is used as a catalyst, a very complicated process has so far been required, wherein in order to sufficiently effect a deactivation treatment of the catalyst, a large amount of a deactivator solution is added to a product obtained after the polymerization to effectuate the deactivation treatment, and the product is sufficiently washed to remove the residual monomers and a residue originating in the catalyst, followed by separating and drying the treating solution or recovering the monomers from the washing solution. Such a process is not preferred as well from an economical point of view.

Further, methods are proposed, in which in order to remove complexity accompanied by the deactivation treatment of the catalyst, an added amount of a deactivator solution is reduced, and washing of a crude polymer is excluded (for example, JP-A-52-57285, JP-A-57-80414, JP-A-62-285909, and JP-A-63-27519). However, usually known catalysts such as a boron trifluoride type catalyst can not sufficiently be deactivated by such methods, and it is extremely difficult to obtain copolymers having a good heat stability. In particular, while an increase in a polymerization yield in the polymerization makes it less necessary to recover monomers by washing, a resulting polymer is further instabilized, and a complicated stabilization treatment is required in a subsequent step. After all, the steps are not simplified. In addition, the resulting polymer has a limited stability and therefore is not preferred in terms of quality.

SUMMARY OF THE INVENTION

In view of such existing situation, an object of the present invention is to prepare a copolymer which has a very small amount of unstable terminals even when the polymerization yield is raised and which is thermally very stable by a simple process in which a catalyst can readily be deactivated in a small amount of a deactivator solution and a washing step is unnecessary.

Intensive investigations made by the present inventors in order to achieve the object described above have resulted in finding that the use of particularly an isopolyacid or an acidic salt thereof as a catalyst makes it possible to deactivate the catalyst easily and surely with a deactivator while the catalyst characteristically has a high polymerization activity and can achieve the object described above, and thus completing the present invention.

That is, the present invention relates to a process for preparing a polyacetal copolymer by the copolymerization of trioxane as the principal monomer with a cyclic ether or a cyclic formal having at least one carbon—carbon bond as a comonomer, characterized in that the copolymerization is effected using an isopolyacid or an acidic salt thereof as a polymerization catalyst until the remaining monomers account for at most 10% by weight of all the fed monomers, followed by addition of a solution containing a deactivator for the above catalyst in an amount of 0.01 to 10% by weight based on the resulting crude polymer to deactivate the catalyst, and a subsequent heat-melting treatment of the crude polymer intact without washing it.

The present invention is characterized in preparing a polyacetal copolymer which provides very small unstable parts even when the polymer is molten by heating as it is and which is thermally very stable particularly by using an isopolyacid or an acidic salt thereof as a polymerization catalyst which provides a very high polymerization activity and increases a polymerization yield in a very small amount of the catalyst and then can be deactivated very surely and effectively in a small amount of a deactivator solution, so that residual matters originating in the catalyst does not entirely exert harmful effects and a washing step is not required. This is specifically effective while in the case of conventional boron trifluoride type catalysts, it is difficult to avoid adverse effects such as decomposition caused by matters originating in the catalyst even after deactivation thereof.

DETAILED DESCRIPTION OF THE INVENTION

The present invention will be explained below in detail.

The isopolyacid is synonymous with isomultiple acid, homonuclear condensed acid, or homogeneous multiple acid and is a high molecular inorganic oxygen acid comprising a condensation product of an inorganic oxygen acid having a single kind of metal, which is derived from an isopolyacid salt represented by the following Formula (1) or (2):

$$mM'_2O \cdot nM^V_2O_5 \cdot xH_2O \quad (1)$$

$$mM'_2O \cdot nM^{VI}O_3 \cdot xH_2O \quad (2)$$

wherein M' represents mainly an alkali metal; $M^V$ represents vanadium, niobium or tantalum belonging to the group V of the periodic table; $M^{VI}$ represents chromium, molybdenum, tungsten or uranium belonging to the group VI of the periodic table; m and n each represent an integer of 1 or more; and x represents a number of 0 to 50.

The isopolyacid can be prepared by various methods such as a method in which a solution of the isopolyacid salt represented by Formula (1) or (2) described above, for example, isopolymolybdate, isopolytungstate and isopolyvanadate is treated with ion exchange resins and a method in which a mineral acid is added to a concentrated Solution and it is extracted with ether. Further, acidic salts having a form in which protons of these acids are replaced partially with various metals can be used as well for the catalyst in the present invention.

Specific examples of these isopolyacids include, for example, isopolytungstic acid such as paratungstic acid and metatungstic acid, isopolymolybdic acid such as paramolybdic acid and metamolybdic acid, and isopolyvanadic acid. Among them, isopolytungstic acid is preferred.

An amount of the isopolyacid or acidic salt thereof used as the polymerization catalyst for the monomers comprising primarily trioxane depends on the kind thereof, and the polymerization can be controlled by suitably changing it. In general, the amount thereof falls in a range of 0.05 to 100 ppm, preferably 0.1 to 50 ppm based on the whole amount of the monomers to be polymerized. A used amount of preferably 0.1 to 10 ppm is sufficient for the isopolyacid having a very strong activity, such as paratungstic acid. Copolymerization capable of being effectuated even in so small an amount of the catalyst is effective for controlling to the least undesirable reactions such as principal chain decomposition of the polymer and depolymerization which are caused by the catalyst, and is economically advantageous.

In the present invention, it is preferred for evenly carrying out the reaction to add to the monomers the preceding catalyst which is diluted with an inert solvent exerting no adverse effects on the polymerization. Ether compounds which are organic solvents capable of dissolving the isopolyacid or acidic salt thereof, for example, n-butyl ether, are preferred as the diluent. However, the diluent shall not be restricted thereto.

Trioxane which is a cyclic trimer of formaldehyde is used as the principal monomer in the present invention.

The comonomer used in the present invention is a cyclic ether or a cyclic formal having at least one adjacent carbon-carbon bond, and all of conventional comonomers used for copolymerization with trioxane can be used.

Typical examples of such cyclic ether or cyclic formal include, for example, 1,3-dioxolane, diethylene glycol formal, 1,4-butanediol formal, 1,3-dioxane, ethylene oxide, propylene oxide, and epychlorohydrin. Further, cyclic esters, for example, β-propiolactone, and vinyl compounds, for example, styrol can be used as well. Further, alkylenediglycidyl ether or diformal can also be used as a comonomer for allowing the copolymer to form a branched or cross-linked molecular structure. It includes, for example, butanediol dimethylideneglyceryl ether and butanediol diglycidyl ether. In particular, the preferred comonomers include cyclic ethers or cyclic formals such as 1,3-dioxolane, diethylene glycol formal, 1,4-butanediol formal, and ethylene oxide. An amount of the comonomer used in the present invention is 0.1 to 20 mole %, preferably 0.2 to 10 mole % based on trioxane. The amount of less than 0.1 mole % increases the unstable terminals and deteriorates the stability. The excess amount softens the resulting polymer and lowers the melting point. Accordingly, both are not preferred.

In the polymerization process of the present invention, publicly known chain transfer agents, for example, low molecular weight linear acetals such as methylal can be added as well in order to control the polymerization degree according to purposes. The polymerization system is maintained preferably in the condition that impurities having active hydrogens, for example, water, methanol, formic acid or the like are not substantially present.

The polymerization of the present invention can be carried out by the same facilities and method as those used for a conventional copolymerization of trioxane. That is, either of a batch system and a continuous system can be employed, and a method in which liquid monomers are used to obtain a solid, powder or bulk polymer as the polymerization proceeds is generally applied.

With respect to polymerizing apparatuses used in the present invention, conventional reactors equipped with a stirrer can be used for a batch system, and continuous polymerizing apparatuses for trioxane which have so far been proposed, such as a cokneader, a two shaft screw type continuous extrusion blender, a two shaft paddle type continuous blender, and others that have been proposed so far can be used for a continuous system. Further, two or more kinds of polymerizing equipments can be used in combination.

The polymerization temperatures fall in a range of 60° to 120° C., particularly preferably 65° to 100° C.

In the present invention, the unreacted monomers remaining after the polymerization have to account for 10% by weight or less, preferably 5% by weight or less, and more preferably 3% by weight or less. This is because the present invention aims primarily at carrying out no washing for the polymerization product, and therefore an increased amount of the residual monomers is not preferred. In general, in order to reduce unreacted monomers, a polymerization rate can be raised to a fixed level or higher. In the case of the present invention, this can readily be achieved by suitably controlling an amount of the catalyst used and a polymerization time (a residence time in a continuous system). In particular, since the catalyst used in the present invention has a high activity, the polymerization can be completed for a relatively short time even with a small amount of the catalyst.

Further, a part of the residual monomers can be removed by evaporation to control the residual monomers to a given amount.

Next, after finishing the copolymerization, a given amount of a solution containing a deactivator for the catalyst is added and blended with the crude polymer in which the residual monomers are reduced to 10% by weight or less to deactivate the catalyst.

The deactivator used in the present invention can be added in an amount sufficient to neutralize and deactivate the catalyst and is added preferably in the form of a deactivator solution prepared by dissolving or dispersing the deactivator in water or an organic solvent.

In this case, an added amount of the activator solution is 0.01 through 10% by weight, preferably 0.05 through 5% by weight, and particularly preferably 0.1 through 3% by weight based on the weight of the crude polymer. The present invention is characterized in that the amount of the deactivator solution is very small, and it is absolutely insufficient for dipping the crude polymer to make it slurry. However, in combination with the characteristics of the specific catalyst used in the present invention, the catalyst can sufficiently be deactivated even in so small an amount by stirring and blending well with the crude polymer. The present invention is characterized in that even if matters originating in the catalyst remain after deactivation, the crude polymer can be molten as it is by heating without separating and washing away the deactivating solution and exerting adverse effects such as acceleration of decomposition of the polymer to obtain the stable polyacetal copolymer.

All of the same publicly known base materials as those used for conventional boron trifluoride type catalysts are effective as the deactivator used in the present invention and include, for example, ammonia, various amine compounds, trivalent phosphorus compounds, and oxides, hydroxides, organic acid salts or inorganic acid salts of alkali metals or alkaline earth metals. These deactivators are added in the form of an aqueous solution or an organic solvent solution in a range of a fixed amount or less. The amine compounds include primary, secondary and tertiary aliphatic amines and aromatic amines, for example, methylamine, dimethylamine, trimethylamine, ethylamine, diethylamine, triethylamine, butylamine, dibutylamine, tributylamine, and alcoholamines corresponding thereto (for example, triethanolamine and the like), aniline, diphenylamine, heterocyclic amines, and hindered amines (various piperidine derivatives).

The trivalent phosphorus compounds include, for example, triphenylphosphine.

The alkali metal or alkaline earth metal compounds include oxides, hydroxides, inorganic weak acid salts such as carbonates, bicarbonates, phosphates, borates and silicates, organic acid salts such as acetates, oxalates, formates, benzoates, terephthalates, isophthalates, phthalates and fatty acid salts, alkoxides such as methoxide, ethoxide, n-butoxide, sec-butoxide and tert-butoxide, and phenoxides of alkali metals or alkaline earth metals. Among them, oxides, carbonates and fatty acid salts are preferably used. The alkali metal or alkaline earth metal components include lithium, sodium, potassium, cesium, magnesium, calcium, strontium, and barium. Among them, lithium, sodium, potassium, magnesium, and calcium are preferably used. Specifically, calcium hydroxide, magnesium hydroxide, sodium carbonate, calcium acetate, calcium stearate, and calcium 12-hydroxystearate are particularly preferred.

Water or an organic solvent is used as a solvent for dissolving the deactivator. The organic solvent includes alcohols such as methanol and ethanol, ketones such as ethyl ketone and acetone, aromatic compounds such as benzene, toluene and xylene, and saturated hydrocarbons such as cyclohexane, n-hexane and n-heptane. Water is particularly preferred.

A method for adding the deactivator solution described above to the crude polymer is not specifically restricted. In order to effectively carry out dispersion and contact thereof, the solution is preferably sprayed on the crude polymer or sufficiently stirred and blended after adding the solution.

In a deactivation treatment of the catalyst, the crude polymer is preferably fine powder. For this purpose, a polymerization reactor has preferably a function to sufficiently pulverize a bulk polymer, or the reaction product may be pulverized separately by means of a crusher after the polymerization, and then the deactivator may be added. Further, pulverization and stirring may be carried out at the same time in the presence of the deactivator.

With respect to a grain size of the crude polymer in the deactivation treatment, 90% or more of the crude polymer has a grain size of 3 mm or less, preferably 2 mm or less, and more preferably 1 mm or less.

The deactivation treatment temperatures are 20 to 120° C., preferably 40° to 100° C. In particular, a part of the unstable parts of the crude polymer can be removed at this stage by treating it at relatively high temperatures. In the case where particularly a solution of an amine compound or an aqueous ammonia solution is used as the deactivator, the effects thereof are markedly revealed.

Further, in the present invention, other prescribed stabilizers are preferably added after or at the same time as the deactivation treatment, if necessary.

The substances as they are, given as the examples of the deactivators described above have a function as a stabilizer component in many cases. It is important to add as stabilizers other than the above compounds, substances publicly known as stabilizers for conventional polyacetal resins, for example, various hindered phenol type antioxidants. Further, various nitrogen-containing compounds, metal oxides and fatty acid salts may be added and used in combination.

The hindered phenol type antioxidants include, for example, 2,6-di-t-butyl-4-methylphenol, triethylene glycol-bis[3-(3-t-butyl-5-methyl-4-hydroxyphenyl)propionate], 1,6-hexanediol-bis-[3-(3,5-di-t-butyl-4-hydroxyphenyl) propionate], tetrakis[3-(3,5-di-t-butyl-4-hydroxyphenyl) propionate]methane, N,N'-hexamethylenebis(3,5-di-t-butyl-4-hydroxyhydrocynnamide), 2-t-butyl-6-(3'-t-butyl-5'-methyl-2'-hydroxybenzyl)-4-methylphenylacrylate, and 3,9-bis[2-{(3-t-butyl-4-hydroxy-5-methylphenyl) propionyloxy}-1,1'-dimethylethyl]-2,4,8,10-tetraoxaspiro [5.5]-undecane.

The nitrogen-containing compounds include dicyanediamide, melamine or derivatives thereof, urea or derivatives thereof, benzotriazole compounds, piperidine compounds (hindered amines), and various polyamides or copolymers thereof (for example, nylons 6, 12) 6/12, 6/66/610, and 6/66/610/12).

Oxides of alkaline earth metals are preferred as the metal oxides, and the fatty acid metal salts include calcium salts or magnesium salts of higher fatty acids.

Further, various other additives, for example, fillers such as glass fiber, crystallization accelerators (nuclear agents), and releasing agents may be added and blended at this stage, if necessary.

In the present invention, the crude polymer blended with the deactivator for the catalyst is then subjected to a heat-melting treatment.

The heat-melting treatment in the present invention is carried out preferably at temperatures falling in a range of a melting point of the resulting polymer or higher and up to 250° C., particularly preferably the melting point or higher and up to 230° C. The temperatures higher than 250° C. are not preferred since the polymer is decomposed. A heat treating apparatus shall not specifically be restricted. The apparatuses having a function to knead a molten polymer and a vent function are required and include, for example, single shaft or multi-shaft continuous extrusion-kneaders having at least one vent hole and cokneaders.

In the present invention, the polymerization catalyst is further completely deactivated in this melt-kneading treatment, and the deactivator solution blended accelerates decomposition and elimination of the unstable parts of the crude polymer and is removed from the vent part together with water added as the deactivator, other solvents, and the residual monomers, whereby pellets of the stable polyacetal copolymer can be obtained. In order to meet this purpose, it is a matter of course to preferably reduce pressure in the vent hole for aspiration.

EXAMPLES

The examples of the present invention shall be shown below but it is a matter of course that the present invention shall not be restricted thereto. The terms and the measuring methods used in the examples and the comparative examples are shown below.

% or ppm: shown by weight

Residual monomer: shown by % of the residual monomers based on the whole fed monomers.

Melt index (MI): shows a melt index (g/10 min) measured at 190° C.; this was evaluated as a characteristic value corresponding to a molecular weight; that is, the lower the Mi is, the higher the molecular weight is.

Alkali decomposition rate (an amount of unstable parts present): pellets of the copolymer are pulverized, and 1 g thereof is put in 100 ml of a 50% methanol aqueous solution containing 0.5% of ammonium hydroxide % to heat it at 180° C. for 45 minutes in a closed vessel; then, an amount of formaldehyde which is formed by decomposition and eluted into the solution is quantitatively analyzed and shown by % based on the polymer.

Heating weight loss rate: shown by a weight loss rate observed when 5 g of the copolymer pellets is heated at 230° C. for 45 minutes in the air.

Examples 1 to 13 and Comparative Examples 1 to 3

A continuous mixing reactor which had a cross-section formed by superposing partially two circles and in which a barrel equipped with a jacket for passing a heat transfer medium (cooling medium) on the outside and two rotational shafts equipped with a lot of paddles for agitating and propelling were disposed inside at the longitudinal direction was used, wherein while passing warm water of 70° C. through the jacket and rotating the two rotational shafts at a fixed rate, trioxane containing 3.5% of a comonomer shown in Table 1 and 700 ppm of methylal as a chain transfer agent was continuously fed to a place thereof; an isopolyacid catalyst (a solution prepared by dissolving it in di-n-butyl ether) shown in Table 1 was added to the same place at the same time in an amount shown in Table 1 based on the whole monomer to carry out the copolymerization.

Then, after the reaction product discharged from a discharge port of this polymerization apparatus was continued to be further polymerized in a different apparatus (a part of the polymer was sampled to determine a residual monomer amount), a deactivator solution shown in Table 1 was added, and then the polymer was passed through a crusher to pulverize it, and the pulverized polymer was agitated at 60° C. for 30 minutes (the pulverized polymer of 90% or more had a grain size of 2 mm or less). Then, 0.5% of tetrakis-[methylene-3-(3,5-di-t-butyl-4-hydroxyphenyl)propionate]methane as a stabilizer and 0.2% of melamine were added to agitate and mix them for 5 minutes in a Honschel mixer. Then, the polymer was molten and kneaded at a temperature of 210° C. at a vacuum degree of 5 mm Hg at the vent part by means of a two shaft extruding machine equipped with a vent and extruded to prepare pellets. The pellets were dried and then measured for an MI, a heat decomposition rate, and a heating weight loss rate. The results thereof are shown in Table 1.

For the sake of comparison, the copolymers using boron trifluoride butyl ethelate as the catalyst were prepared in the same manner (Table 2).

TABLE 1

| Example | Polymerization catalyst | | | Residual monomer amount |
|---|---|---|---|---|
| | Kind | Amount (ppm based on whole monomer) | Comonomer | after polymerization (% based on whole monomer) |
| 1 | Paratungstic acid | 4 | 1,3-Dioxolane | 2.0 |
| 2 | " | 4 | " | 2.0 |
| 3 | " | 4 | " | 2.0 |
| 4 | " | 4 | " | 2.0 |
| 5 | " | 4 | " | 2.0 |
| 6 | " | 4 | " | 2.0 |
| 7 | " | 4 | " | 2.0 |
| 8 | " | 4 | " | 2.0 |
| 9 | " | 2 | " | 5.5 |
| 10 | Metatungstic acid | 6 | " | 3.0 |
| 11 | Paramolybdic acid | 8 | " | 3.0 |
| 12 | Paratungstic acid | 4 | 1,4-Butanediol formal | 2.8 |
| 13 | " | 4 | Diethylene glycol formal | 3.6 |

TABLE 1-continued

| | | Deactivator solution | | | Properties of extruded pellet | |
| --- | --- | --- | --- | --- | --- | --- |
| Example | Deactivator | Solvent (deactivator concentration, %) | Added amount (% based on crude polymer) | MI (g/10 min) | Alkali decomposition rate (%) | Heating weight loss rate (%) |
| 1 | Trimethylamine | Water (20) | 2.0 | 8.8 | 0.63 | 0.46 |
| 2 | " | " | 0.5 | 9.5 | 0.71 | 0.51 |
| 3 | " | " | 5 | 8.5 | 0.88 | 0.39 |
| 4 | " | Benzene (5) | 2.0 | 9.2 | 0.68 | 0.52 |
| 5 | Triethylamine | Water (20) | 2.0 | 9.1 | 0.65 | 0.50 |
| 6 | Ammonia | " | 2.0 | 8.6 | 0.60 | 0.43 |
| 7 | Calcium hydroxide | Water (0.1) | 7 | 9.8 | 0.71 | 0.61 |
| 8 | Sodium carbonate | Water (1) | 5 | 8.6 | 0.57 | 0.55 |
| 9 | Trimethylamine | Water (20) | 2.0 | 9.0 | 0.75 | 0.58 |
| 10 | " | " | 2.0 | 9.5 | 0.75 | 0.58 |
| 11 | " | " | 2.0 | 10.3 | 0.83 | 0.61 |
| 12 | " | " | 2.0 | 8.0 | 0.55 | 0.41 |
| 13 | " | " | 2.0 | 8.2 | 0.51 | 0.35 |

TABLE 2

| | Polymerization catalyst | | | Residual monomer amount |
| --- | --- | --- | --- | --- |
| Comparative Example | Kind | Amount (ppm based on whole monomer) | Comonomer | after polymerization (% based on whole monomer) |
| 1 | Paratungstic acid | 4 | 1,3-Dioxolane | 15* |
| 2 | " | 4 | " | 2.0 |
| 3 | Boron trifluoride dibutyl ethelate | 40 (as BF$_3$) | " | 4.8 |

| | | Deactivator solution | | | Properties of extruded pellet | |
| --- | --- | --- | --- | --- | --- | --- |
| Comparative Example | Deactivator | Solvent (deactivator concentration %) | Added amount (% based on crude polymer) | MI (g/10 min) | Alkali decomposition rate (%) | Heating weight loss rate (%) |
| 1 | Trimethylamine | Water (20) | 2.0 | Impossible to extrude | | |
| 2 | " | " | 15 | Impossible to extrude | | |
| 3 | " | " | 2.0 | 16.5 | 1.56 | 0.63 |

*shortened polymerization's time

As apparent from the explanations and the examples described above, the production process of the present invention is a process which is simplified very much as compared with conventional processes since a washing step is eliminated, wherein the catalyst can completely be deactivated; there are no troubles such as decomposition and degeneration attributable to the catalyst; the stable polyacetal copolymer having less unstable parts can be obtained; and the polyacetal copolymer having an excellent quality can be prepared economically.

What is claimed is:

1. A process for preparing a polyacetal copolymer comprising the steps of:

(a) subjecting a reaction mixture comprised of trioxane as a principal monomer and a cyclic ether or cyclic formal having at least one carbon-carbon bond as a comonomer to copolymerization reaction conditions using an isopolyacid or an acidic salt thereof as a polymerization catalyst;

(b) continuing the copolymerization according to step (a) until the remaining unreacted monomers account for at most 10% of all the monomers fed into the reaction mixture to thereby obtain a product mixture comprised of crude copolymer product, unreacted monomers and the polymerization catalyst, and then subsequently (c) treating the product mixture with a solution containing a deactivator for said polymerization catalyst in an amount of 0.01 to 10% by weight based on the resulting crude copolymer product to deactivate the catalyst therein; and then subsequently without washing the treated product mixture (d) forming a melt of the crude copolymer product.

2. The process for preparing a polyacetal copolymer as claimed in claim 1, wherein said polymerization catalyst is an isopolyacid or an acidic salt thereof derived from an isopolyacid salt represented by the following Formula (1) or (2):

  (1)

  (2)

$$mM'_2O \cdot nM^V_2O_5 \cdot xH_2O \quad (1)$$

$$mM'_2O \cdot nM^{VI}O_3 \cdot xH_2O \quad (2)$$

wherein $M'$ represents principally an alkali metal; $M^V$ represents vanadium, niobium or tantalum belonging to the group V of the periodic table; $M^{VI}$ represents chromium, molybdenum, tungsten or uranium belonging to the group VI of the periodic table; m and n each represent an integer of at least 1; and x represents a number of 0 to 50.

3. The process for preparing a polyacetal copolymer as claimed in claim 1, wherein said isopolyacid or acidic salt thereof is paratungstic acid, metatungstic acid, paramolybdic acid, metamolybdic acid, or an acidic salt thereof.

4. The process for preparing a polyacetal copolymer as claimed in claim 1, wherein said comonomer is at least one selected from among 1,3-dioxolane, diethylene glycol formal, 1,4-butanediol formal, and ethylene oxide.

5. The process for preparing a polyacetal copolymer as claimed in claim 1, wherein said solution containing the deactivator for the catalyst is an aqueous or organic solvent solution containing as the deactivator at least one compound selected from among ammonia, amine compounds, trivalent phosphorus compounds, and oxides, hydroxides, inorganic salts and organic salts of alkali metals or alkaline earth metals.

6. The process for preparing a polyacetal copolymer as claimed in claim 1, wherein step (c) includes treating the crude copolymer product and unreacted monomers with a particulate deactivator having at least 90% of its particles with a grain size of 3 mm or less.

7. The process for preparing a polyacetal copolymer as claimed in claim 1, wherein prior to step (d) there is practiced the step of adding a stabilizer to the product mixture.

* * * * *